United States Patent [19]

Boutineau

[11] 4,186,353
[45] Jan. 29, 1980

[54] LASER AMPLIFICATION SYSTEM

[75] Inventor: Jean-Louis Boutineau, Palaiseau, France

[73] Assignee: Compagnie General d'Electricite, Paris, France

[21] Appl. No.: 937,375

[22] Filed: Aug. 28, 1978

[30] Foreign Application Priority Data

Sep. 8, 1977 [FR] France .................................. 77 27181

[51] Int. Cl.² ............................. H01S 3/23; H01S 3/10
[52] U.S. Cl. ..................................... 330/4.3; 350/147; 350/157
[58] Field of Search ................... 330/4.3; 350/147, 157

[56] References Cited

U.S. PATENT DOCUMENTS

| | | | |
|---|---|---|---|
| 4,069,458 | 1/1978 | Farcy et al. | 350/157 |
| 4,084,908 | 4/1978 | Johnson | 350/147 |
| 4,139,263 | 2/1979 | Lehureau et al. | 350/157 |
| 4,143,332 | 3/1979 | Michon et al. | 330/4.3 |

FOREIGN PATENT DOCUMENTS

2041458 1/1971 France ...................................... 330/4.3

2298208 8/1976 France ...................................... 330/4.3

OTHER PUBLICATIONS

Boquiellon, "Dispositif Anti-Retour pour Laser A Rubis," 1975, pp. 339–343, Nov. Rev. Optique, t, 6, #6.
Ammann et al., "High-Peak-Power, 532 nm Pumped Dye Laser," 4/74, pp. 463–465, IEEE Jour. Quant. Elec., vol. Qe10, #4.
Grischkowsky, "Low Loss, Double Pass System for Laser Amplifiers," 4/72, pp. 3485–3486, IBM Tech. Disc. Bull., vol. 14, #11.

*Primary Examiner*—Nelson Moskowitz
*Attorney, Agent, or Firm*—Sughrue, Rothwell, Mion, Zinn and Macpeak

[57] ABSTRACT

A laser amplification system comprises in series on the emission axis of a laser oscillator a germanium plate inclined at the Brewster angle, a Fresnel parallelepiped, a laser amplifier and a reflecting mirror, as well as a Fresnel parallelepiped and a laser amplifier aligned on the reflection axis of the plate. The system is intended for application in the study of plasmas.

1 Claim, 4 Drawing Figures

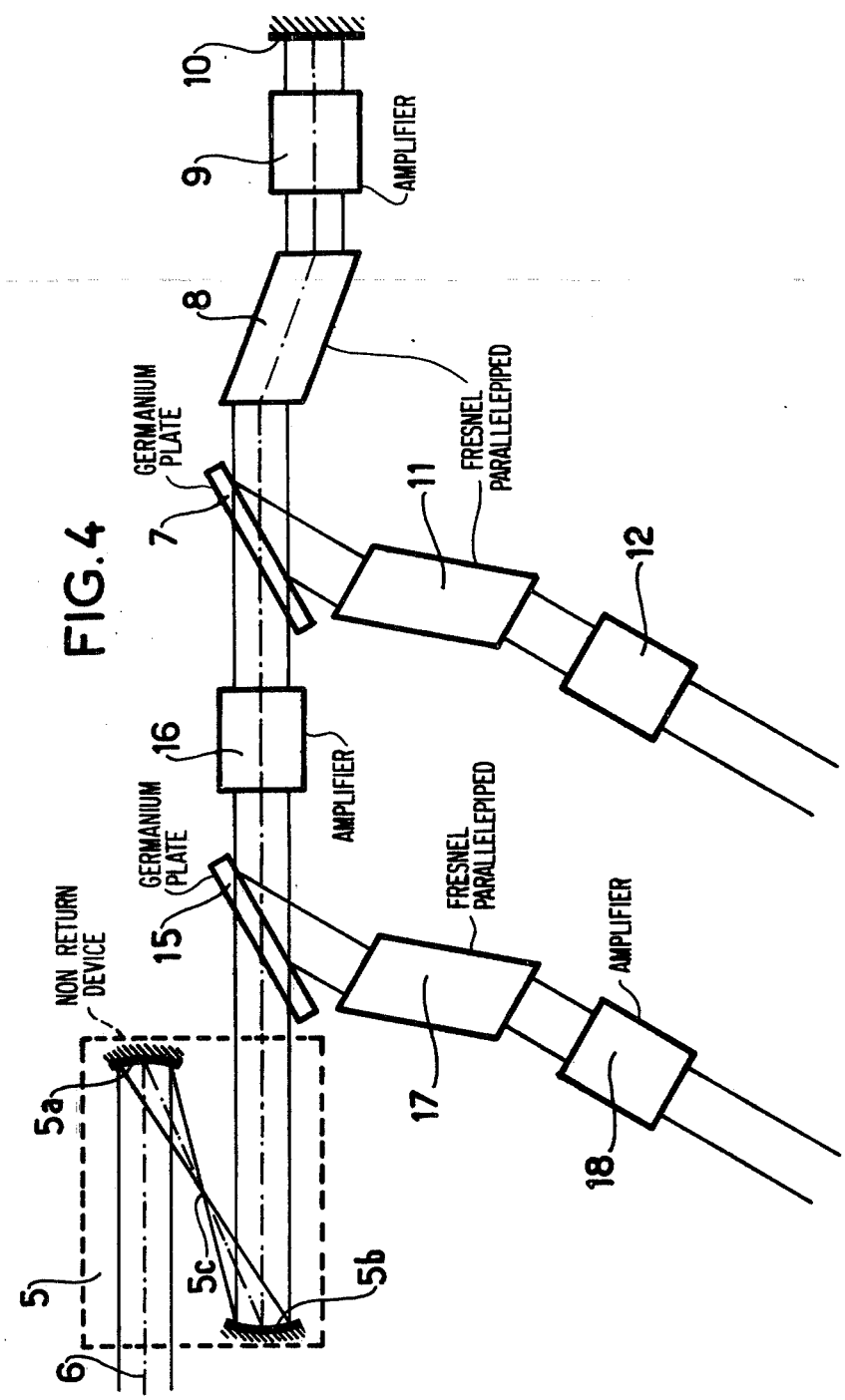

LASER AMPLIFICATION SYSTEM

FIELD OF THE INVENTION

The present invention relates to a laser amplification system and in particular to a carbon dioxide laser amplification system which is capable of supplying light pulses of wavelength of 10.6 microns.

BACKGROUND OF THE INVENTION

Such a system conventionally comprises the following components disposed successively along the same optical axis:

a laser oscillator provided with a modulator so as to emit very short pulses, the modulator including a linear polarizer at its output.

a quarter-wave plate suitably disposed to transform linear polarization into circular polarization; and one or more laser amplifiers to amplify light pulses which can then be focussed onto a target.

The function of the quarter-wave plate is to protect the modulator against return pulses which result from back-scattering or from reflection of part of the light received by the target. Indeed, these return pulses are circularly polarized, as are those which were transmitted from the plate towards the target. In the reverse direction, they pass firstly through the amplifiers where they are further amplified and then through the quarter-wave plate which transforms their circular polarization into rectilinear polarization with a polarization direction perpendicular to the direction of polarization which they had on their outgoing path at the output of the polarizer. Therefore, the polarizer stops these return pulses, thereby protecting the modulator.

Systems of this type have a disadvantage when it is required to increase the energy of the pulses by increasing the gain of the amplifiers: if this gain exceeds a critical value, spontaneous laser pulses appear which are generated between parasitic reflecting surfaces of the amplification system. It is difficult in practice to avoid the presence of such parasitic reflecting surfaces and the spontaneous laser pulses which result therefrom can be very detrimental.

The present invention aims to provide a laser amplification system which is protected against return pulses but which is not so bulky and has increased gain without there being any danger of high-power spontaneous oscillations.

SUMMARY OF THE INVENTION

The present invention provides a laser amplification system which comprises:

a laser oscillator disposed along a first axis, this oscillator being provided with a modulator constituted by an electro-optical cell and at least one polarizer so that the light beam which leaves the oscillator is polarized in a first plane;

an optical component disposed on the first axis at the output of the laser oscillator, this component being capable of allowing the light beam linearly polarized in the first plane to pass;

a first laser amplifier disposed at the output of the optical component;

a first optical transformer disposed optically in series with the first laser amplifier, the transformer being of a type which is capable of changing the linear polarization of the beam which it receives into circular polarization;

a reflector disposed so as to return the beam which has passed through the first amplifier in the direction from which it came, the return being polarized in a second plane perpendicular to the first plane after having passed through the first optical transformer and the first amplifier, in the opposite direction, at least a part of the energy polarized in the second plane being reflected by the optical component along a second axis which is different from the first axis; and a second laser amplifier disposed on the second axis for said part of the energy of the beam reflected by the optical component to pass through it.

The invention is characterized in that:

said optical component is made of a first optical plate made of a material which is transparent to the light of the beam, this first plate being inclined at the Brewster angle in the first plane in relation to the beam which leaves the oscillator, the optical plate reflecting the greater part of the energy of the beam polarized in the second plane along the second axis and allowing the other part of the energy of this beam to pass; and in that it also includes:

a second optical transformer of said type, disposed on the second axis; and a non-return device disposed between the oscillator and the first optical plate, the device being capable of absorbing said other part of the energy of the beam polarized in the second plane and of allowing the laser beam which leaves the oscillator to pass.

The invention is described hereinbelow by way of a nonlimiting example with reference to the accompanying drawings.

BRIEF DESCRIPTION OF THE DRAWINGS

FIG. 4 shows schematically another embodiment of a laser amplification system in accordance with the invention.

In FIG. 1, a carbon dioxide laser oscillator 1 supplies a pulse with a wavelength of 10.6 microns which lasts for about 30 nonoseconds. This pulse passes through a modulator constituted by a Pockels cell 2 between two crossed polarizers 3 and 4. The pulse which leaves the modulator is linearly polarized, e.g. vertically and lasts 1.5 nonoseconds. This pulse passes through a non-return device 5 which includes in particular an afocal optical system formed by two concave mirrors 5a and 5b disposed so as to reflect the pulse successively; these mirrors have a common true focus 5c. This pulse then passes through a germanium plate 7 inclined at the Brewster angle in relation to the axis 6, then through an optical transformer, for example a Fresnel parallelepiped 8 which transforms its linear polarization into circular polarization. The pulse then passes through an amplifier 9, and then, after reflection on the mirror 10, passes back in the opposite direction through the amplifier 9 and the parallelipiped 8 which transforms its circular polarization into rectilinear polarization perpendicular to the polarization direction of the pulse which leaves the polarizer 4, i.e. a horizontal polarization in the example chosen.

Figure 1:
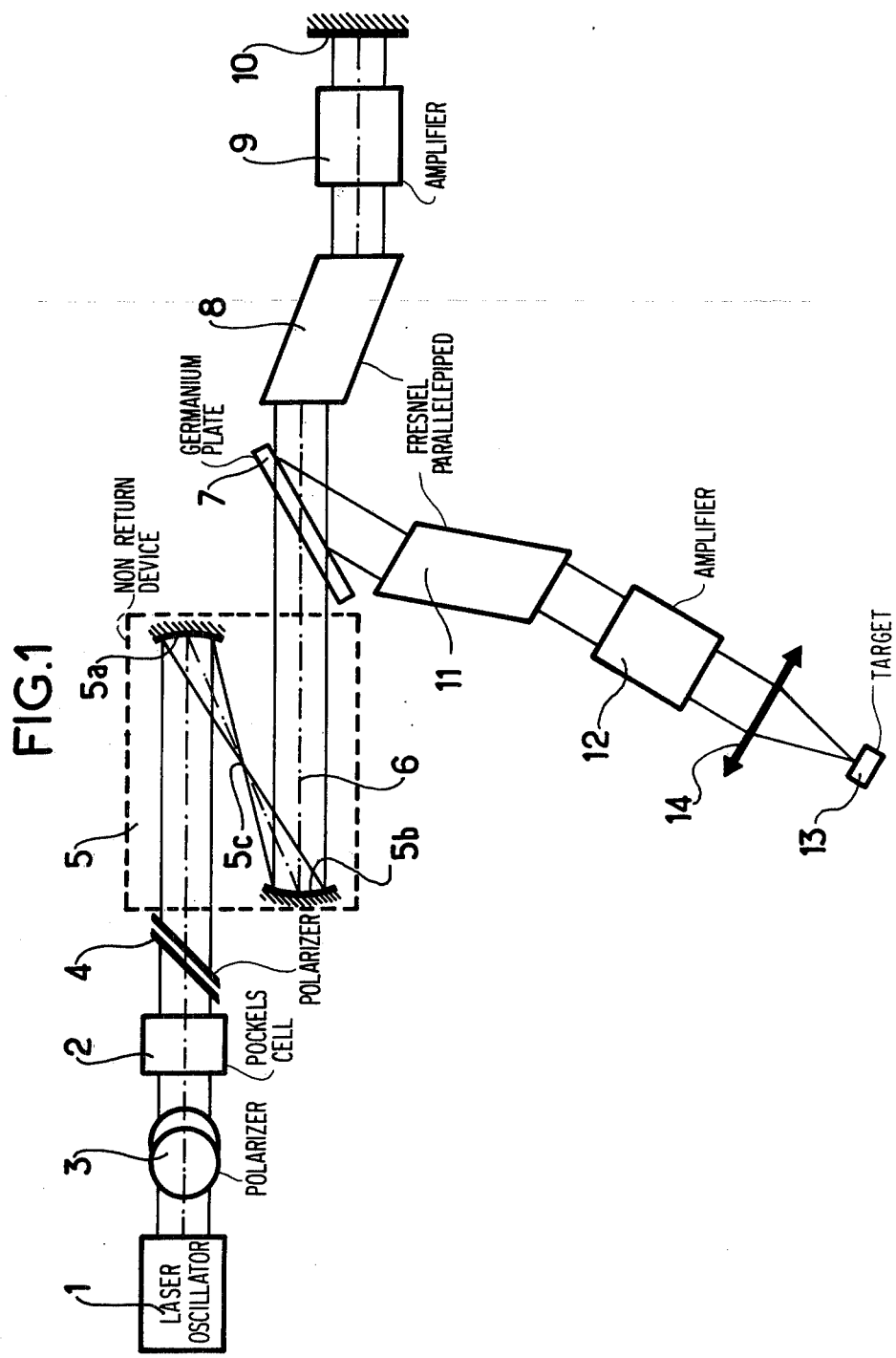
FIG. 1 shows schematically one embodiment of a laser amplification system in accordance with the invention.

When the greater part (78%) of the energy of the pulse has passed a second time through the parallelepiped 8, it is reflected by the plate 7. It then passes through another Fresnel parallelepiped 11 which transforms its rectilinear polarization into circular polarization and is then again amplified in an amplifier 12 before being focussed onto a target 13 by a lens 14.

When the other part (22%) of the energy of the pulse has passed a second time through the parallelepiped 8, it passes through the plate 7 and is then absorbed by the non-return device 5. Indeed, this device has a predetermined power threshold. This threshold is adjusted to allow the relatively weak laser pulses which come from the oscillator and move towards the amplifiers to pass without any absorption of power and to absorb the return pulses whose power is greater than the threshold by breakdown at the focus 5c.

A part of the energy of the pulse which strikes the target 13 may be back-scattered. In this case, the back-scattered energy passes in the opposite direction through the lens 14, the amplifier 12 where it is amplified and the parallelepiped 11 which transforms its circular polarization into vertical rectilinear polarization. The back-scattered energy is sent outside the axis 6 by passing through the plate 7. Therefore this energy cannot damage the modulator.

Figure 2:
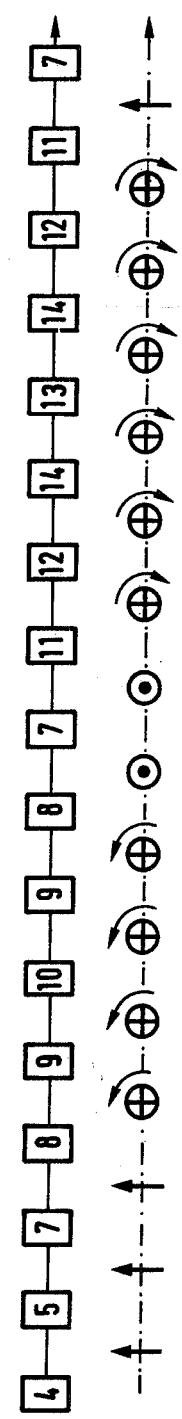
FIG. 2 is a diagram which shows the variations in the polarization of the light of a pulse which propagates along the system shown in FIG. 1.

FIG. 2 is an analytical diagram which shows clearly the variations in the polarization of the light of the pulse which leaves the laser oscillator and propagates in the system as described hereinabove. On the upper line of this diagram, the various components of the system are identified by their reference numerals in the direction in which this pulse passes through them. The lower line shows the polarization of light between the successive components: vertical arrows symbolize vertical linear polarization; circles with a dot in the centre symbolize horizontal linear polarization; circles with two perpendicular diameters symbolize circular polarization with curved arrows to show the directions of the electric field of the light.

As may be seen from the diagram, light passing through a Fresnel parallelepiped transforms circular polarization into rectilinear polarization and vice versa. Light passing through two Fresnel parallelepipeds in series transforms a vertical linear polarization into a horizontal linear polarization and vice versa and reverses the direction of rotation of a circular polarization. A suitably disposed quarter-wave plate would effect the same transformations. This diagram also shows that the type of linear polarization or the direction of rotation of a circular polarization is not changed by reflection on a mirror or a target.

It should be observed that for clearness' sake, the part of the pulse which is absorbed by the device 5 after passing twice through the plate 7 is not shown in FIG. 2.

Figure 3:
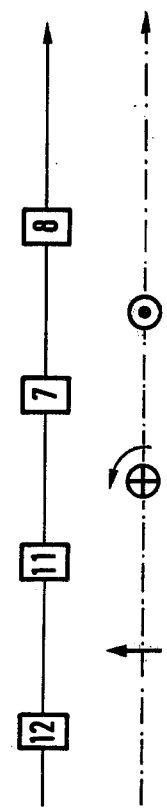
FIG. 3 is a diagram which shows the variations in the polarization of light of an interference pulse which is generated in and propagates in the system shown in FIG. 1.

FIG. 3 shows the progress of a spurious light pulse which is generated in the amplifier 12 and which propagates in the reverse direction towards the plate 7.

This spurious pulse is vertically polarized, for example, at the output of the amplifier 12; this vertical polarization is transformed into a circular polarization at the output of the parallelepiped 11. The plate 7 deflects the horizontally polarized component of the beam which it receives towards the parallelepiped 8. If the light wave is reflected by the front surface of the parallelepiped 8, it propagates towards the target after being reflected on 7 in the conditions already described with reference to FIG. 2. It is therefore reflected onto the target and is then sent outside the system on passing through the plate 7. Therefore, this spurious pulse cannot cause laser auto-oscillation.

If the light wave propagates beyond the parallelepiped 8 without being reflected, it is returned towards the plate 7 after being reflected on the mirror 10. After having once again passed through the parallelepiped 8, the returned pulse is vertically polarized and therefore passes through the plate 7 without being reflected to be absorbed by the device 5.

Generally, when a plate 7 is placed between two Fresnel parallelepipeds inserted in the amplification system, the amplifiers which are thus separated are prevented from cooperating in generating spurious oscillations. Thus, it is possible to increase the gain of this system by increasing the number of amplifiers while avoiding auto-oscillation.

FIG. 4 shows another embodiment of a laser amplification system in accordance with the invention; the advantage of this embodiment is that it uses part of the energy of the laser pulse which passes through the plate 7 a second time after being reflected by the mirror 10. The system shown in FIG. 4 includes, besides the components shown in FIG. 1, a germanium plate 15 disposed between the component 5 and the plate 7. This plate 15 is inclined at the Brewster angle in relation to the direction of the light rays which propagate parallel to the axis 6. An amplifier 16 is disposed between the plates 15 and 7. A Fresnel parallelepiped 17 and an amplifier 18 are disposed successively on the return axis of the pulses which come from the mirror 15. The pulses which leave the amplifiers 12 and 18 may be focussed by optical devices which are not shown onto a single target. Obviously, the optical delay devices may be disposed in the system so that the pulses which leave the amplifiers 12 and 18 and which strike the single target will arrive accurately in phase.

The operation of the system shown in FIG. 4 is analogous to that shown in FIG. 1. It should be observed however, that the energy which leaves the plate 7 and is sent towards the mirror 10 and which comes from the oscillator is previously amplified in the amplifier 16. Further, this system includes two branches in parallel (11-12 and 17-18) to illuminate the single target. Only 22% of the energy which leaves the amplifier 16 after it has been returned by the mirror 10 is lost.

It will be understood that it is possible to add other components analogous to components 16, 15, 17 and 18 to the system, between the components 5 and 15, so as to recover energy which returns through the plate 15.

An amplification system in accordance with the invention may be applied to studying plasmas.

It must be understood that the invention is in no way limited to the embodiments described and illustrated which have been given only by way of example. In particular, without going beyond the scope of the invention, some dispositions may be changed and some means may be replaced by equivalent means. Thus, the laser oscillator may have a wavelength other than 10.6 microns. In this case, optical plates such as 7 and 15 are made of materials which are transparent to light emitted by the oscillator.

I claim:

1. A laser amplification system comprising:
a laser oscillator disposed along a first axis, said oscillator being provided with a modulator constituted by an electro-optical cell and at least one polarizer so that the light beam which leaves the oscillator is polarized in a first plane;
an optical component disposed on the first axis at the output of the laser oscillator, said component being capable of allowing the light beam linearly polarized in the first plane to pass;
a first laser amplifier disposed at the output of the optical component;
a first optical transformer disposed optically in series with the first laser amplifier, said transformer being of a type which is capable of changing the linear polarization of the beam which it receives into circular polarization;
a reflector disposed so as to return the beam which has passed through the first amplifier in the direction from which it came, the return beam being polarized in a second plane perpendicular to the first plane after having passed through the first optical transformer and the first amplifier, in the opposite direction, at least a part of the energy polarized in the second plane being reflected by the optical component along a second axis which is different from the first axis; and
a second laser amplifier disposed on the second axis for said part of the energy of the beam reflected by the optical component to pass through it;
the improvement wherein:
said optical component is a first optical plate made of a material which is transparent to the light of the beam, said first optical plate being inclined at the Brewster angle in the first plane in relation to the beam which leaves the oscillator, said first optical plate reflecting the greater part of the energy of the beam polarized in the second plane along the second axis and allowing the other part of the energy of this beam to pass;
and wherein said system also includes:
a second optical transformer of said type, disposed on the second axis; and
a non-return device disposed between the oscillator and the first optical plate said non-return device being capable of absorbing said other part of the energy of the beam polarized in the second plane and of allowing the laser beam which leaves the oscillator to pass.

2. An amplification system according to claim 1, further including:
a second optical plate of said material and disposed parallel to the first plate on the first axis between the non-return device and the first optical plate;
a third laser amplifier disposed on the first axis between the second optical plate and the first plate, the greater part of the beam which comes from the reflector and which leaves the third amplifier being reflected on the second optical plate along a third axis parallel to the second axis, the other part of this beam passing through the second optical plate;
a third optical transformer of said type, disposed on the third axis; and
a fourth laser amplifier disposed at the output of the third transformer.

3. An amplification system according to claim 1, wherein the optical transformers of said type are Fresnel parallelepipeds.

4. An amplification system according to claim 1, wherein the optical transformers of said type are quarter-wave plates.

5. An amplification system according to claim 1, wherein the non-return device comprises an afocal optical device with a true focus.

6. An amplification system according to claim 2, wherein the optical transformers of said type are Fresnel parallelepipeds.

7. An amplification system according to claim 2, wherein the optical transformers of said type are quarter-wave plates.

8. An amplification system according to claim 2, wherein the non-return device comprises an afocal optical device with a true focus.

* * * * *